(12) United States Patent
Olaru

(10) Patent No.: US 7,510,392 B2
(45) Date of Patent: Mar. 31, 2009

(54) INJECTION NOZZLE WITH A REMOVABLE HEATER DEVICE HAVING ONE OR MORE HEATING ELEMENTS

(75) Inventor: George Olaru, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 720 days.

(21) Appl. No.: 10/986,061

(22) Filed: Nov. 12, 2004

(65) Prior Publication Data

US 2005/0104242 A1    May 19, 2005

Related U.S. Application Data

(63) Continuation-in-part of application No. 10/701,493, filed on Nov. 6, 2003, now Pat. No. 7,156,648.

(60) Provisional application No. 60/518,744, filed on Nov. 12, 2003, provisional application No. 60/424,004, filed on Nov. 6, 2002.

(51) Int. Cl.
    *B29C 45/20* (2006.01)
(52) U.S. Cl. .................. 425/549; 264/328.15
(58) Field of Classification Search .............. 425/549; 264/328.15
    See application file for complete search history.

(56) References Cited

U.S. PATENT DOCUMENTS

| 2,797,296 A | 6/1957 | Fowler et al. |
| 3,370,156 A | 2/1968 | Graves |
| 3,647,532 A | 3/1972 | Friedman |
| 3,730,373 A | 5/1973 | Kozbelt |
| 3,808,573 A | 4/1974 | Cappell |

(Continued)

FOREIGN PATENT DOCUMENTS

CA    2 383 481 A1    3/2001

(Continued)

OTHER PUBLICATIONS

Search Report from European Application No. 03025483, 5 pages, dated Jan. 23, 2004.

(Continued)

*Primary Examiner*—Tim Heitbrink
(74) *Attorney, Agent, or Firm*—Medler Ferro PLLC

(57) ABSTRACT

An injection molding system and injection molding method for making molded parts that include one or more planar heaters having a thin or a thick film resistive heater element coupled, secured, or releaseably secured to one or more sides of each of the one or more injection molding nozzles. The releasably secure coupling allows heater device to be visually inspected, tested, removed, and/or replaced. The planar heater device can have a support device patterned with a film electrical resistive path. The electrical resistive path can include any pitch or number of electrical resistance lines, such that a longitudinal uniform heat profile is generated along a melt flow channel of the one or more injection molding nozzles when the nozzles are in use. In some examples, the planar heater has more than one film resistive heater element that can be coupled to one or each side of a nozzle, with dielectric material interposed between the planar film resistive heater elements. This can allow for additional or alternative heating in various applications.

25 Claims, 11 Drawing Sheets

U.S. PATENT DOCUMENTS

| | | | |
|---|---|---|---|
| 3,812,323 A | 5/1974 | Pink | |
| 3,829,657 A | 8/1974 | Hinz | |
| 3,872,281 A | 3/1975 | Krieg et al. | |
| 4,058,704 A | 11/1977 | Shimizu | |
| 4,203,198 A | 5/1980 | Hackette et al. | |
| 4,286,377 A | 9/1981 | Hurko et al. | |
| 4,492,555 A | 1/1985 | Schulte | |
| 4,793,795 A | 12/1988 | Schmidt et al. | |
| 4,856,979 A | 8/1989 | Schreck | |
| 4,859,835 A | 8/1989 | Balderson | |
| 4,892,474 A | 1/1990 | Gellert | |
| 4,923,387 A | 5/1990 | Gellert | |
| 4,999,049 A | 3/1991 | Balderson et al. | |
| 5,411,392 A | 5/1995 | Von Buren | |
| 5,464,343 A | 11/1995 | Hepler | |
| 5,503,545 A * | 4/1996 | Benenati | 425/547 |
| 5,504,304 A | 4/1996 | Noguchi et al. | |
| 5,587,188 A | 12/1996 | Hepler | |
| 5,955,120 A | 9/1999 | Deissler | |
| 5,973,296 A | 10/1999 | Juliano et al. | |
| 5,980,236 A | 11/1999 | Gellert et al. | |
| 6,043,467 A | 3/2000 | Little | |
| 6,305,923 B1 | 10/2001 | Godwin et al. | |
| 6,341,954 B1 | 1/2002 | Godwin et al. | |
| 6,390,803 B1 | 5/2002 | Christen | |
| 6,394,784 B1 | 5/2002 | Gellert et al. | |
| 6,405,785 B1 | 6/2002 | Gellert et al. | |
| 6,409,497 B1 | 6/2002 | Wurstlin | |
| 6,575,729 B2 | 6/2003 | Godwin et al. | |
| 6,619,948 B2 | 9/2003 | Gunther | |
| 6,764,297 B2 | 7/2004 | Godwin et al. | |
| 6,805,549 B2 | 10/2004 | Gunther | |
| 6,960,072 B1 | 11/2005 | Hepler | |
| 7,131,831 B2 * | 11/2006 | Bazzo et al. | 425/549 |

FOREIGN PATENT DOCUMENTS

| | | |
|---|---|---|
| CA | 2 413 256 A1 | 12/2001 |
| DE | 35 01 840 A1 | 7/1986 |
| DE | 35 05 658 A1 | 8/1986 |
| DE | 197 23 374 A1 | 12/1997 |
| DE | 199 41 038 A1 | 3/2001 |
| DE | 100 04 068 A1 | 8/2001 |
| EP | 0 402 501 A1 | 12/1990 |
| EP | 0 670 209 A1 | 9/1995 |
| EP | 1 223 017 A1 | 7/2002 |
| WO | WO 82/00935 | 3/1982 |
| WO | WO01/54882 A1 | 8/2001 |
| WO | WO01/98054 A1 | 12/2001 |
| WO | WO01/98055 A1 | 12/2001 |

OTHER PUBLICATIONS

Patent Abstracts of Japan, Publication No. 2000218671, published Aug. 8, 2000, 1 page.

Stamm, A., "Mikro-Flachduse für kleine Nestabstände," Plastverarbeiter, vol. 53, Nr. 6, p. 34, Zechner Und Huethig Verlag GmbH, 2002.

English Abstract for German Patent No. DE3501840, published Jul. 24, 1986, 1 page, from http://vs.espacenet.com.

English Abstract for German Patent No. DE3505658, published Aug. 21, 1986, 1 page, from http://vs.espacenet.com.

English Abstract for German Patent No. DE19723374, published Dec. 18, 1997, 1 page, from http://vs.espacenet.com.

English Abstract for European Patent No. EP1223017, published Jul. 17, 2002, 1 page, from http://vs.espacenet.com.

* cited by examiner

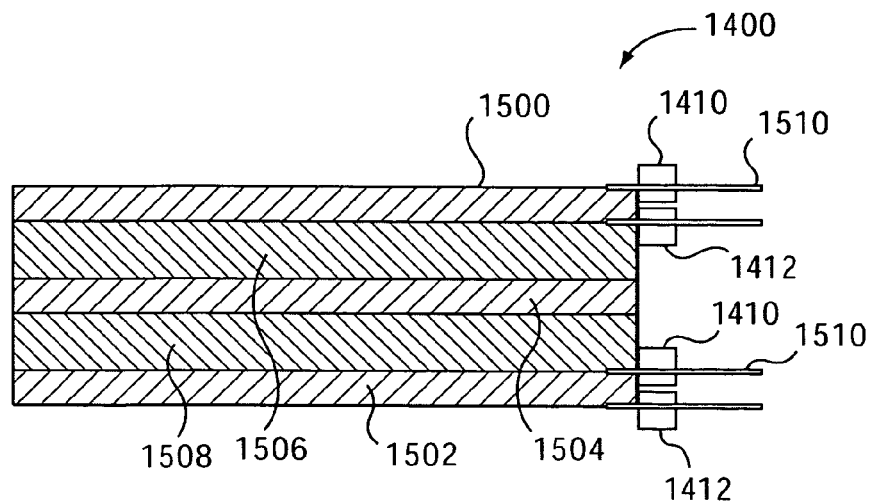
FIG. 15
FIG. 17
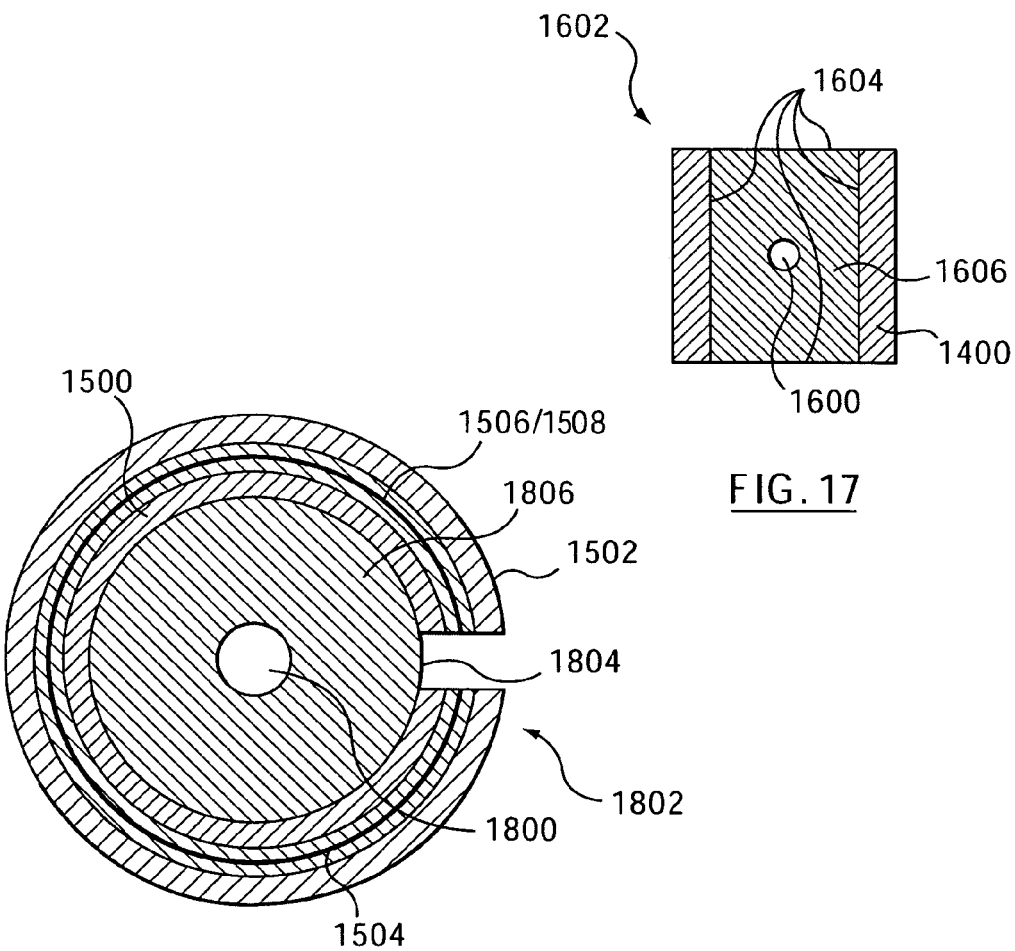
FIG. 19

INJECTION NOZZLE WITH A REMOVABLE HEATER DEVICE HAVING ONE OR MORE HEATING ELEMENTS

CROSS-REFERENCE TO RELATED APPLICATIONS

This application is a continuation-in-part of U.S. application Ser. No. 10/701,493 now U.S. Pat. No. 7,156,648, filed Nov. 6, 2003, entitled "Injection Nozzle with Planar Heater," which claims benefit under 35 U.S.C. § 119(e) to U.S. Provisional Application No. 60/424,004, filed Nov. 6, 2002, entitled "Injection Nozzle With Planar Heater," which are incorporated by reference herein in their entireties.

This application also claims benefit under 35 U.S.C. 119(e) to U.S. Provisional Patent Application No. 60/518,744, filed Nov. 12, 2003, entitled "Injection Nozzle With A Removable Film Heater Device Having Multiple Film Heating Elements," which is incorporated by reference herein in its entirety.

BACKGROUND OF THE INVENTION

1. Field of the Invention

The present invention is related to heating and heaters for injection molding nozzles, more particularly for injection nozzles used in injection molding applications.

2. Background Art

Nozzles, nozzle arrays, micro nozzles and micro nozzle arrays have been used for many injection molding applications. An injection molding operation ideally maintains a constant or consistent viscosity and speed of a melt stream of moldable material through the one or more heated injection nozzles. When the viscosity and speed of the melt stream is maintained at a constant value, injection molded items that are uniform in appearance and have other desired characteristics can be produced. One way to control or maintain the viscosity and ideal melt stream speed is to have uniform heating along a nozzle channel in each injection nozzle used to form the item.

In an injection nozzle having a circular cross-section, a heating device can include a helical coil wrapped around a cylindrical nozzle body.

FIG. 13 shows a conventional nozzle 1302. In a nozzle 1302 having a non-circular cross-section, heating can be accomplished by inserting a heating rod 1304 alongside an entire length of nozzle channel 1308. This arrangement produces an almost ideal consistency in viscosity and melt stream speed. However, because heat transfer occurs along only one side of the nozzle channel 1308 and a small surface area of the rod 1304 is adjacent the nozzle channel 1308, there are still some areas of the melt stream that have varying viscosity and flow speeds. This is especially true when using small or tight pitch between nozzles 1302.

Some examples of flat nozzles are those manufactured by Mold Masters® Limited, Gunther Hotrunner Systems, and Heitec. An exemplary flat nozzle is found in U.S. Pat. No. 4,923,387 ("the '387 patent"), which shows an electrical heater plate connected to a nozzle. The outer shape of the nozzle is not defined. Another exemplary flat nozzle is found in U.S. Pat. No. 4,793,795 ("the '795 patent") that shows a flat nozzle heated by a coiled heater, where the heater is embedded in the cylindrical surface of the flat nozzle. In the '387 and '795 patents, which are assigned to the assignee of the current invention, the heating element of the heater is a coiled wire that is a three dimensional (3D) structure occupying a rather significant space around or inside the nozzle. This makes the nozzles shown in the '387 and '795 patents somewhat bulky and impractical for inside gating and small pitch applications. Both of these documents are incorporated herein by reference in their entirety.

Small pitch nozzles having all flat lateral surfaces are shown in DE 19723374 ("the DE '374 document") to Drach, which published on Dec. 18, 1997, and is assigned to Heitec Heisskanaltechnik GmbH, which is incorporated by reference herein in its entirety. In order to eliminate the impact of the heater on the nozzle size along one direction, the DE '374 document shows a nozzle having a rectangular body, a melt channel, and a tubular heater located along only one side of the melt channel. Placing the cylindrical coiled heater lateral with respect the melt channel increases the size of the nozzle along one direction and limits the size of the nozzle along the other direction.

A similar rectangular nozzle is shown in U.S. Published Patent Application No. 2002/0102322 A1 to Gunther ("the '322 PPA"), which published on Aug. 1, 2002, which is incorporated by reference herein in its entirety. The '322 PPA places the cylindrical heater along one side of the melt channel. Similar to the DE '374 document, the '322 PPA increases the size of the nozzle along one direction making it impractical for internal gating of small parts. This is because the DE '374 document and the '322 PPA provide cylindrical or 3D heating devices. These heating devices also provide a non-uniform heat profile along the nozzle melt channel.

The use of cylindrical 3D thin and thick film heaters for inside gating and small tight pitch applications may be achieved by the nozzle designs shown in U.S. Pat. No. 6,305,923 to Godwin et al. and U.S. Pat. No. 6,341,954 to Godwin et al., which are both assigned to Husky Injection Molding Systems Ltd. Similar round nozzles having 3D layered heater elements are disclosed in the U.S. Pat. No. 5,504,304 to Noguchi, U.S. Pat. No. 5,973,296 to Juliano, and WO 01/17317 to Gunther. All these patents are incorporated herein by reference in their entirety, and teach various 3D layered resistive heating elements, which may provide a compact design. Nevertheless making layered resistive heating elements on a cylindrical or 3D surface is on one hand a time consuming method and on the other hand is a method that cannot be applied to manufacture simultaneously a large number of heating elements in batches that deliver heaters having the same geometrical and functional characteristics. The use of a flat heating means permanently attached to a flat nozzle is taught by U.S. Published Patent Application 2003/0003188 A1 to Gunther ("the '188 PPA"), which is incorporated by reference herein in its entirety. However, the '188 PPA requires the heater device to be permanently coupled to the flat nozzle, which increases maintenance and replacement costs if the heater or nozzle were to fail.

Also, heaters in injection nozzles (e.g., injection molding nozzles) ideally produce a constant or consistent viscosity and speed of a melt stream of moldable material, which produces accurate items that are uniform in appearance. In conventional injection molding systems, when a heater starts to improperly function or fail completely, the entire nozzle might need to be removed from a manifold connection and replaced. Removing and replacing a nozzle requires shutting down a production line for an extended period of time. This increases manufacturing costs because of the expense of having to replace an entire nozzle, the inefficiency of production time, and the cost for labor being idle during removal and replacement of a nozzle.

Typically, injection molding nozzles have a heater element connected to one or more surfaces of a cylindrical or substantially flat or planar nozzle body. The heater element may be a tubular cartridge heater, film deposited, a clamped heater band, helical coil, or other type of heater. There are also injection nozzles including cast-in heaters, cartridge heaters, and heat pipe heaters located (embedded) entirely within the nozzle body proximate the melt channel. Embedded heaters tend to provide a desirable heat profile, a desirable heat transfer, and desirable heat efficiency because they are located in intimate contact within the nozzle body. Also each is disposed relatively closer to the melt channel than heaters connected to an outside surface of the nozzle body. There is a further class of flat nozzles incorporating cartridge heaters located either on one side or two, opposite sides of the melt channel. These flat nozzles are usually clustered into arrays of two or more nozzles and are utilized in areas with very limited space.

However, when certain film heaters are used, either thick or thin film heaters, they may not produce enough heat and/or may fail during processing. This can lead to defective products being produced and/or lost production time.

Therefore, what is needed is a system and method that allows a an injection nozzle heater to produce a desired amount of heat, while also compensating for failure of the heater so that lost production time is substantially reduced.

BRIEF SUMMARY OF THE INVENTION

Embodiments of the present invention provide a system including one or more nozzles having at least one flat outer surface and a releasably securable patterned planar heater (e.g., rigid, flexible, film, etc.) device coupled to the one or more flat nozzles. The one or more flat nozzles can have at least one flat outer surface and one curved outer surface, a square cross-section, a rectangular cross-section, or a triangular cross-section. The planar heater device can include an electrical resistive path patterned on a support device. The patterned resistive path can be configured to generate a longitudinal uniform heat profile along a melt flow channel. The planar heater device can be coupled to one or more sides and one or more sections of each of the one or more nozzles.

Other embodiments of the present invention provide a method of manufacturing including producing a sheet including one or more patterned planar heater devices, removing a portion of the sheet corresponding to a size of one or more flat nozzles, and releasably coupling the portion of the sheet to the one or more flat nozzles. The method can also include patterning an electrical resistive path on each of the one or more patterned planar heater devices. The method can also include using the electrical resistive path to generate a longitudinal uniform heat profile along a melt flow channel of the one or more flat nozzles.

Embodiments of the present invention provide a system including a nozzle body having an outer surface and a melt channel and a film heater device coupled to the outer surface of the nozzle body. The outer surface can be substantially curved (e.g., a cylindrical nozzle, or the like) or substantially planar (e.g., a flat nozzle, or the like). The film heater device can include first and second film heating elements (e.g., planar, curved, rigid, flexible, thick film, thin film, etc.) that are substantially the same size and that cover substantially a same path, zone, and/or area of the melt channel. The film heater device is configured to provide a desired amount of heat and to compensate for one of the first and second film heating elements failing.

In one embodiment, the film heater device can be releasably coupled to the outer surface, which allows for easy removal of the film heater device for subsequent repair or replacement of the first and second film heating elements. A releasable coupling system can include a clamp, a screw, a bolt, an easily removable adhesive material, a magnet, or the like.

In another embodiment, a temperature sensor (for example, one or more thermocouples) can be associated with the film heater device. The temperature sensor can communicate with a control system. The control system will operate so that the first and second film heating elements may operate during alternative time periods. Thus, if one stops operating or fails, the other one can automatically, and almost simultaneously, be turned ON by the control system.

Using film heating elements can provide for mass production of the film heating elements with substantially perfect repeatability of patterned layers on the film heating elements, easy visual inspection for defects of the film heating elements, and a very compact size for the film heater device.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 1 and 2 show side views of various exemplary nozzle and heater arrangements according to embodiments of the present invention.

FIGS. 3, 4, 5, and 6 show various cross-sectional views of nozzles according to various embodiments of the present invention.

FIG. 15 is a side view of the film heater device of FIG. 14.

FIG. 17 shows a cross-sectional view of the flat nozzle along line B-B of FIG. 16.

FIG. 19 shows a cross-sectional view of the cylindrical nozzle along line C-C of FIG. 18.

Figure 2:
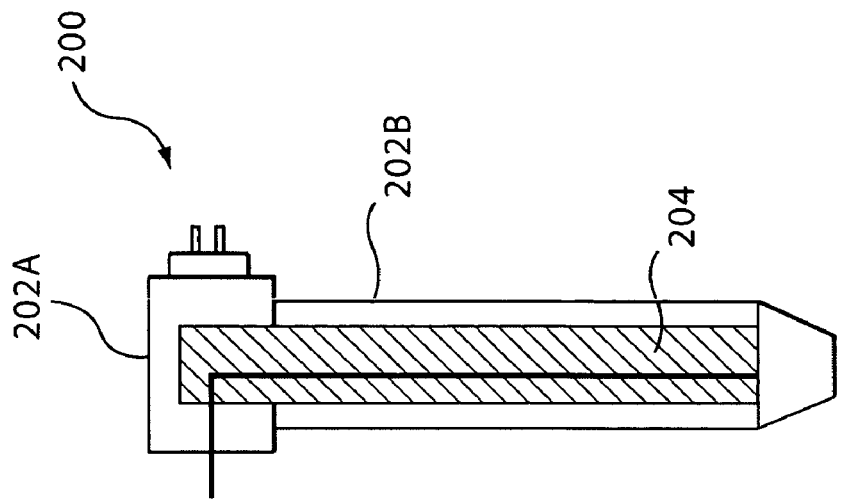

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the present invention provide an injection molding system and an injection molding method where one or more planar heater devices (e.g., rigid, flexible) comprise thin or thick film deposited resistive layers, etc. These flat-planar nozzle heaters including film deposited layers are coupled, secured, or releaseably secured (hereinafter, all are referred to as "coupled") to one or more sides of one or more nozzles having at least one flat-planar, or quasi flat-planar nozzle surface). The coupling of the planar-flat nozzle heater to the nozzle body can be done through use of any appropriate adhesives, coupling devices, securing devices, and the like (hereinafter, all are referred to as "coupling devices"). These coupling devices can provide for visual inspection, testing, removal, and/or replacement of the planar heater device. Thus, in contrast to some conventional injection nozzle systems that have a heating rod or other heating elements housed inside or partially inside the nozzle body, the planar heater device according to one embodiment of the present invention is accessible and easily removable and replaceable, when an embodiment or specification of an application so requires these functions.

In another aspect of the embodiments of the present invention the planar heater device can have a support device (e.g., a dielectric support) patterned with an electrical resistive path. The electrical resistive path can include any pitch or number of electrical resistance lines, such that a longitudinal uniform heat profile is generated along a melt flow channel of the one or more nozzles.

The planar, flat or quasi planar or flat heater device according to embodiments of the present invention can be manufactured on any suitable flexible or rigid planar, flat or quasi flat-planar substrate, support or carrier. The thick or thin film electrical resistive layer or layers that form the heating element of the planar or flat heating device can be manufactured using a variety of technologies and method of manufacturing, such as, but not limited to: resistive heater layered patterns, printed layered patterns, etched foil patterns, stamped foil heater, conductive ink patterns.

Other embodiments of the present invention provide a film heater device coupled (e.g., releasably coupled) to a surface of an injection molding nozzle. Unlike the conventional heaters that have a resistive wire element, the film heaters according to this invention include an electrical resistive layer that is patterned or deposited using a variety of methods. The film heater device includes a support (e.g., a heater support) supporting first and second (or more) film heating elements. A dielectric layer or substrate is formed between the film heating elements and the heater support. The first and second film heating elements are substantially the same size and act upon substantially a same area, zone, or path of a melt channel running through the nozzle. Releasably coupling the film heater device allows for easy removal of the film heater device for subsequent repair or replacement of the first and second heating elements, which reduces production down time.

Each film heating element can have a patterned surface that includes an electrical resistive layer to produce the heat and an optional film temperature sensing device. The temperature sensing device can be coupled to a control system, such that a plurality of film heating elements may be used concurrently or alternatively. For instance, when the first and second film heating elements operate in an alternative operation scheme the controller turns one of them ON when the other turns OFF or fails (e.g., the second film heating element provides for redundancy for operational use if and when the first film heating element turns OFF or fails). This can be used to reduce production down time.

Through the use of two, or more, film heating elements, a desired heat value can be obtained that only one film heating element cannot produce. Also, if only the first film heating element (of set of film elements) is needed, the second film heating element (or set of film heating elements) can turn ON if the first film heating element (or set of film heating elements) fails (e.g., turns OFF).

Planar Heater(s) and Nozzle Arrangements

Figure 1:
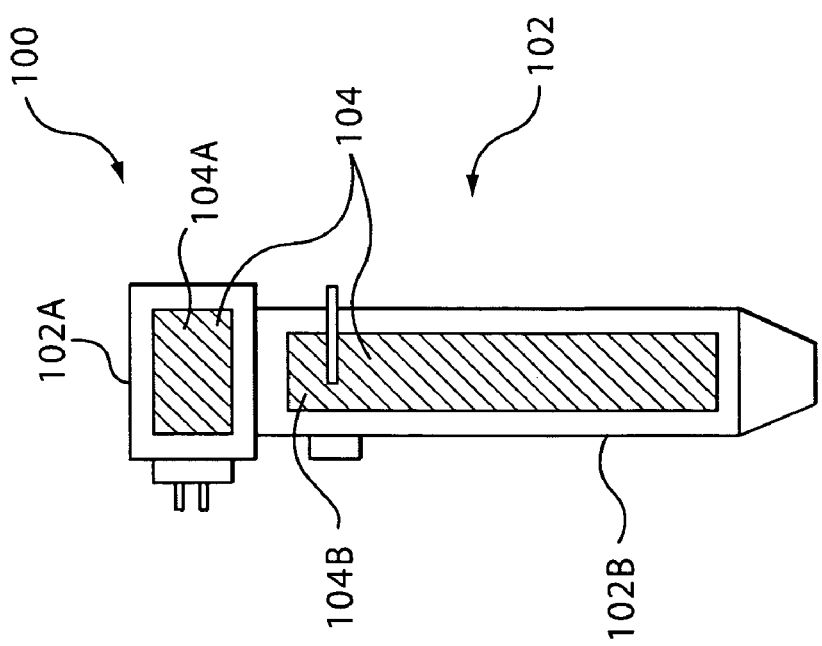

FIG. 1 shows a system 100 according to embodiments of the present invention. System 100 can be in an injection molding application that forms injection-molded items from melted resins. System 100 includes an injection manifold, a mold plate (not shown) and a nozzle 102 having at least one flat nozzle surface and a releaseably securable heater device 104 having planar heater device, for example rigid, flexible, thin or thick film, etc. heater device)). As discussed above, heater device 104 can be secured using any known securing or coupling devices that allow it to be easily removed and replaced.

Heater device 104 can include a first planar or flat heater portion 104A and a second planar or flat heater portion 104B. In one example, both heaters 104A and 104B are made on a separate support that is coupled, but is also independent from, the nozzle body of injection nozzle 102. Accordingly, in operation and due to the cyclical increase and decrease of the processing temperature during the injection molding process that includes an injection step and then a cooling step of the molded article in the mold, the difference in thermal expansion between the nozzle body and the substrate of the planar film heater device will not affect or impact the continuity or physical integrity of the resistive layered film that form the film heater element.

In another example, this is not the case when the film heater is deposited directly on the nozzle substrate.

In a still further example, the use of flat or planar heating device that covers only a portion or a facet/side of the injection nozzle can be used instead of the use of cylindrical heater that surrounds the nozzle body. This is because: a) film heaters can be made on a flat-planar surface more efficiently, faster and in bigger quantities than on a cylindrical surface and b) film heaters on a flat-planar surface can be clamped more efficiently on the nozzle body on a nozzle body portion that is flat-planar.

First heater portion 104A can be used to heat a first section 102A (e.g., nozzle head) of nozzle 102 and second heater portion 104B can be used to heat a second section 102B (e.g., nozzle body) of nozzle 102. Through use of heater device 104, a larger heater surface area is adjacent a flow channel (not shown) running longitudinally through nozzle 102 than in conventional systems.

It is to be appreciated in one embodiment heater device 104 can be coupled to first and second opposite sides of nozzle 102, which can increase heat and uniformity of heat across the entire flow channel. Thus, using heater device 104 of this arrangement material flowing through the flow channel can have a relatively high level of consistency in viscosity and flow rate.

FIG. 2 shows a system 200 according to embodiments of the present invention. System 200 is similar in function to system 100. A main difference between systems 200 and system 100 is that system 200 includes heater device 204 that is configured to cover both a nozzle head 202A and a nozzle body 202B as a single unit.

FIGS. 3, 4, 5, and 6 show various cross-sectional views of nozzles 300, 400, 500, and 600 according to various embodiments of the present invention. It is to be appreciated that nozzles 100 and 200 can include any of the cross-sections of FIGS. 3-6.

Figure 3:
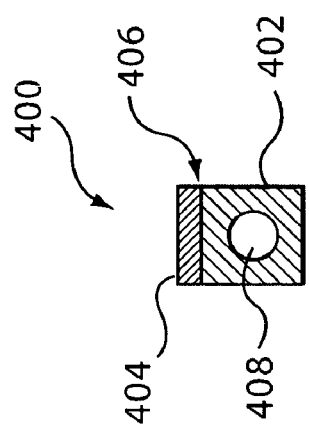

FIG. 3 shows a cross-sectional view of nozzle 300 according to an embodiment of the present invention. Nozzle 300 includes a nozzle body 302 having at least one curved (e.g., substantially planar) side or surface 306 (e.g., convex (curving towards a melt channel 308), concave (curving away from a melt channel 308), etc.). In a first embodiment, heater device 304 can be a rigid planar heater coupled a distance from curved side 306 adjacent one side of nozzle channel 308. In a second embodiment, heater device 304 can be either a flexible planar heater or a planar heater having a slightly curved shape along one direction only that is coupled against a slightly curved side 306 adjacent one side of nozzle channel 308. This slightly curved shape can be either concave or convex, and can assist in positioning of the heater along the melt channel. In these arrangements, a larger surface area of nozzle channel 308 is heated by planar heater 304 than in conventional systems to maintain viscosity and speed of a melt stream (not shown). Also, in the second embodiment, if a curved heater device 304 is used the shape can be used to "lock" heater device 304 into curved side 306, which can allow for a reduction in slippage.

Figure 4:
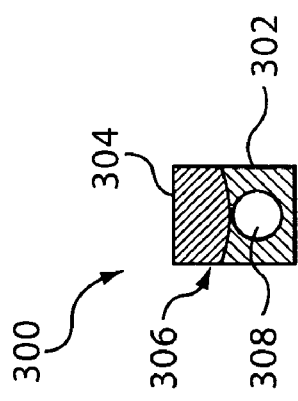

FIG. 4 shows a cross-sectional view of nozzle 400 according to an embodiment of the present invention. Nozzle 400 includes a heater device 404 coupled to a side 406 of nozzle body 402 (e.g., a square or rectangular shaped nozzle body) adjacent nozzle channel 408. In this arrangement, a larger surface area of nozzle channel 408 is heated by planar heater 404 than in conventional systems to maintain viscosity and speed of a melt stream (not shown).

Figure 5:
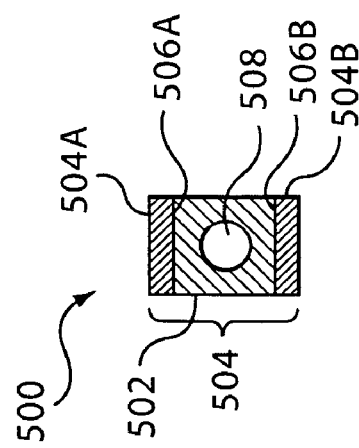

FIG. 5 shows a cross-sectional view of nozzle 500 according to an embodiment of the present invention. Nozzle 500 includes a nozzle body 502 (e.g., a square or rectangular nozzle body) having at least first and second opposite sides 506A and 506B, respectively. A heater device 504 has at least a first portion 504A coupled to first side 506A and a second portion 504B coupled to second, opposite side 506B of nozzle body 502, so that they are positioned adjacent nozzle channel 508. In this arrangement, a larger surface area of nozzle channel 508 is heated using heater device 504 than in conventional systems and in systems including nozzles 300 and 400, discussed above, to maintain viscosity and speed of a melt stream (not shown).

Figure 6:
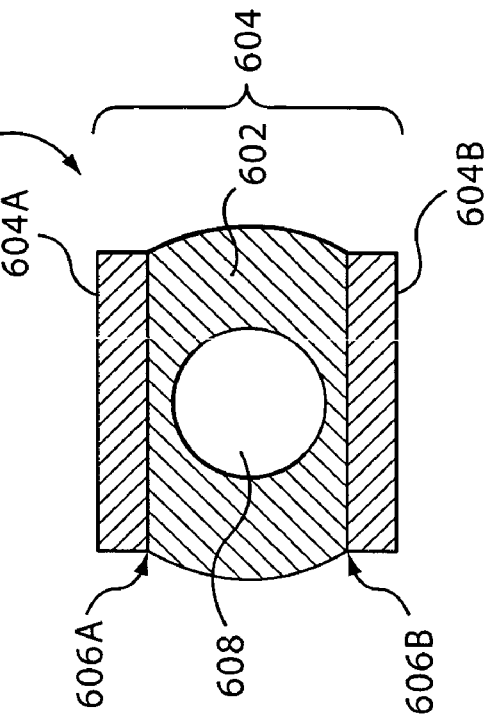

FIG. 6 shows a cross-sectional view of nozzle 600 according to an embodiment of the present invention. Nozzle 600 includes a nozzle body 602 (e.g., partially circular and partially flat nozzle body) having first side 606A and second, opposite side 606B. A heater device 604 includes first portion 604A and second portion 604B. First portion 604A is coupled to first side 606A and second portion 604B is coupled to second side 606B, so that first and second portions 604A and 604B are adjacent nozzle channel 608. In this arrangement, similar to nozzle 500, a larger surface area of nozzle channel 608 is heated by planar heater 604 than in conventional systems, and systems 300 and 400, to maintain viscosity and speed of a melt stream (not shown).

It is to be appreciated that heater devices 304, 404, 504, and/or 604 can be releaseably coupled to sides 306, 406, 506A/B, and/or 606A/B, as is discussed above. This can provide for visual inspection, easy testing, removal, and/or replacement of heater device 304, 404, 504, and/or 604.

Sets of Nozzle and Planar Heater Arrangements

Figure 7:
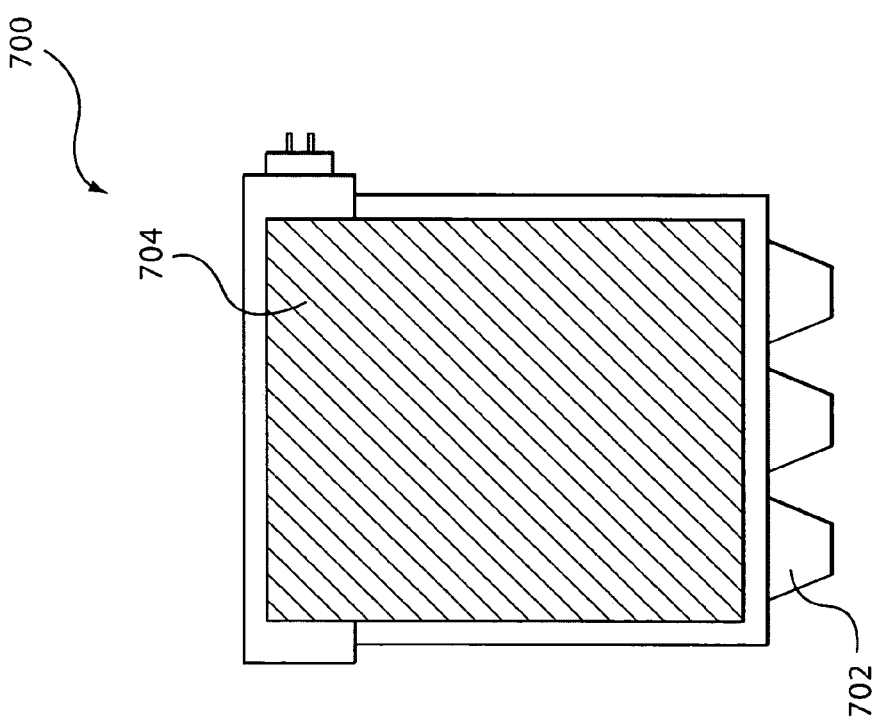
FIG. 7 shows a side view of an exemplary array or set of injection molding nozzles having a single heater arrangement according to an embodiment of the present invention.

FIG. 7 shows a system 700 according to an embodiment of the present invention. System 700 includes a portion having Z nozzles 702 (e.g., Z is an integer greater than 1, for example Z=3). In one embodiment, nozzles 702 can be a thermal gated nozzle array. An appropriately sized heater device 704 is coupled to nozzles 702 to form a uniform heat profile longitudinally along nozzles 702. Heater device 704 can be similar in arrangement and operation to the heater devices discussed above.

Figure 8:
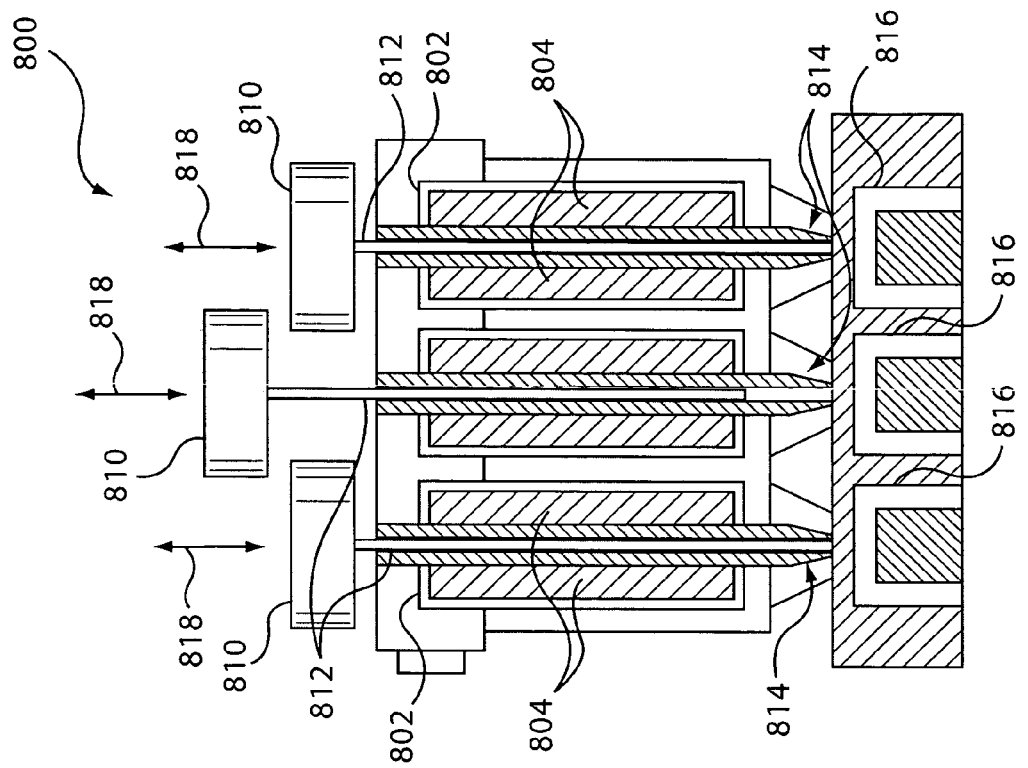
FIG. 8 shows a side view of an exemplary array or set of injection nozzles having a multiple heater arrangement according to an embodiment of the present invention.

FIG. 8 shows a cross-sectional view of a system 800 according to an embodiment of the present invention. System 800 includes a portion having Z nozzles 802 (e.g., Z=3). Nozzles 802 can be valve-gated nozzles having pistons 810 coupled to valve pins 812 that seat and unseat in valve gates 814. Seating and unseating of pins 812 into and out of valve gates 814 can control a flow of melt material (not shown) (e.g., liquid resin) into a mold cavity 816. The seating and unseating of pins 812 can be controlled using pistons 810, which move in the directions of arrows 818. Individual ones of heater device 804 are coupled to respective nozzles 802. Heater devices 804 can be similar in arrangement and operation to the heater devices discussed above.

Thus, FIGS. 7 and 8 illustrate a set of nozzles 702 or 802 (e.g., a nozzle array) being heated by a heater device 704 or set of heater devices 804, according to various embodiments of the present invention. Arrays of heater devices 704 or 804 can be manufactured in long sheets (not shown) (e.g., 100 feet, 1000 feet, etc.). Then, when a particular injection molded item is requested by a customer, a predetermined number of nozzles 702 or 802 can be chosen that will fulfill the specification required. Once an amount of nozzles 702 or 802 has been chosen, a portion of the sheet of heater devices 704 or 804 needed to cover the number of nozzles is cut or otherwise removed from the sheet. Once removed, the portion or portions of the sheet is releaseably coupled to one or more side (surfaces) of nozzles 702 or 802.

In one example, which is merely an illustration and not meant to be limiting, a manufacturing process can produce 100 foot sheeting including arrays of heater devices 704 or 804. When a customer orders an item to be produced that requires 5 nozzles, a portion of the sheet corresponding to a length for 5 nozzles is removed. This removal can be aided through perforating the sheet at various intervals, for example at 5 or 10 nozzle length increments. Therefore, using the above described methods and arrangements, manufacturing time and shipment time for the customer's order can be substantially reduced.

Figure 9:
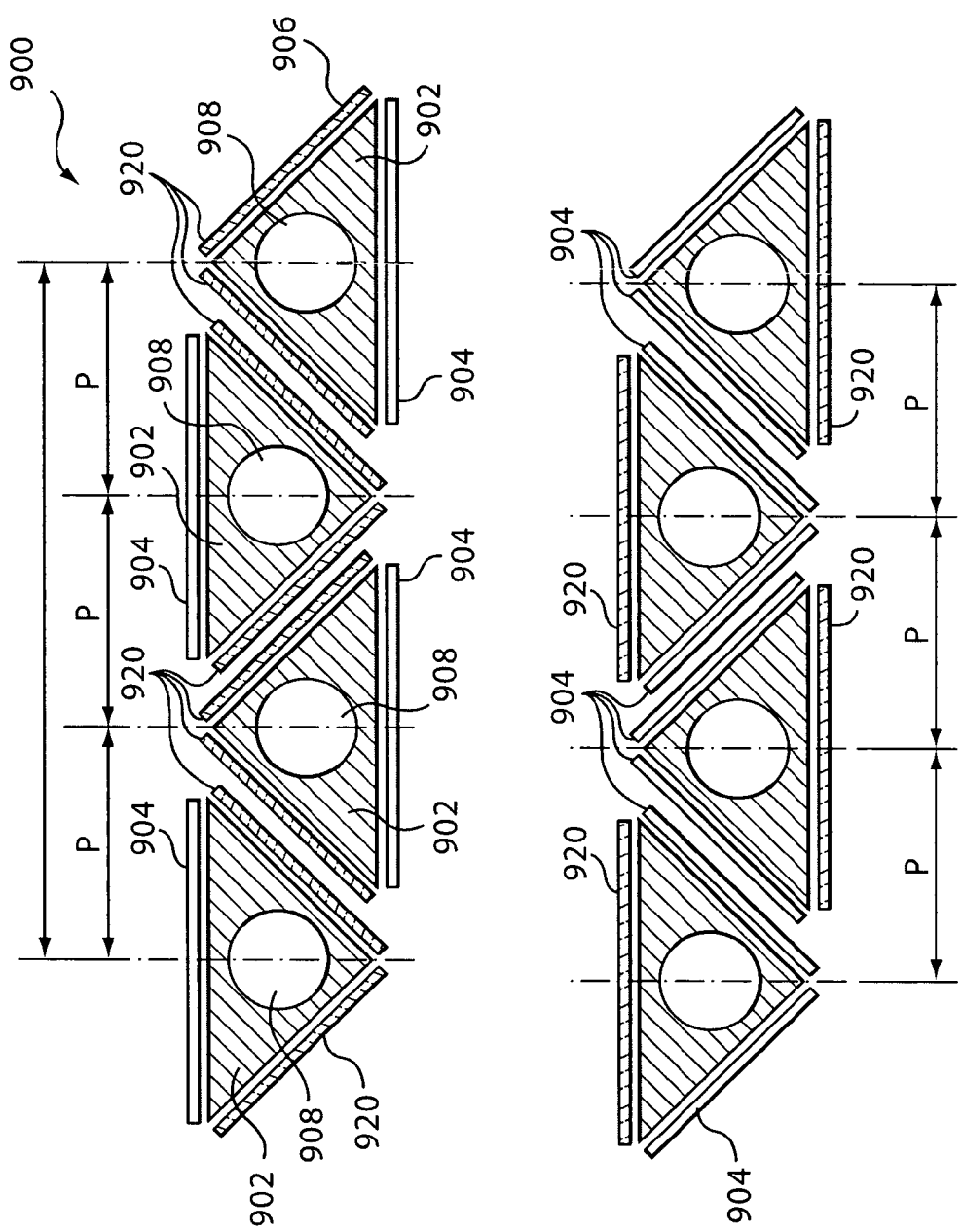
FIGS. 9 and 10 show cross-sectional views of exemplary sets of injection nozzles having planar heaters according to an embodiment of the present invention.

FIG. 9 shows a cross-section view of a system 900 according to an embodiment of the present invention. System 900 includes nozzles 902 having heater devices 904 and a coating 920 (e.g., insulation coating) coupled to one or more sides 906. In this embodiment, nozzles 902 can be tri-face nozzles. It is to be appreciated that each nozzle 902 can have one, two, or three heater devices 904 and one, two, or three coatings 920, respectively. Nozzles 902 also include nozzle channels 908. It also is to be appreciated that any number of nozzles can be included in system 900 based on the specifications of an end-user.

With continuing reference to FIG. 9, a pitch P is shown, which is the spacing between longitudinal axes of adjacent nozzles 902. When more than one nozzle 902 is used, one preferable arrangement results in a tight pitch or small pitch system, as would be apparent to one of ordinary skill in the art from reading this description. Using heater devices 904, pitch P for system 900 can be substantially smaller than conventional systems, while maintaining a longitudinally uniform profile.

Figure 10:
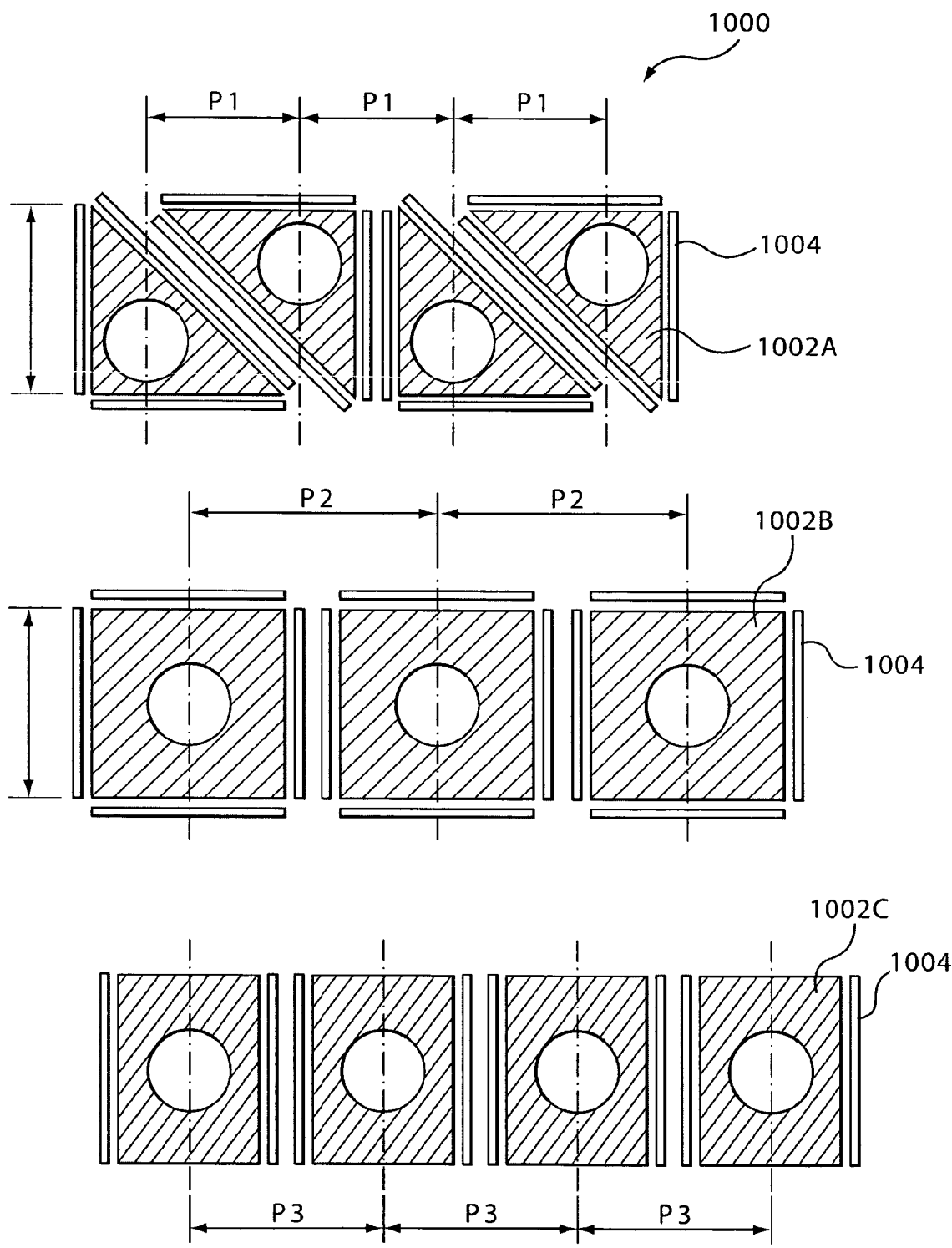

FIG. 10 shows a cross-sectional view of system 1000 according to an embodiment of the present invention. System 1000 can include up to three shapes of nozzles 1002A/B/C. For example, nozzles 1002A can be tri-surface nozzles, nozzles 1002B can be square nozzles, and nozzles 1002C can be rectangular nozzles. When arranged as shown in this one embodiment, a spacing of nozzles 1002A results in pitch P1, a spacing of nozzles 1002B results in pitch P2, and a spacing of nozzles 1002C results in pitch P3. Each of these pitches, P1, P2, and/or P3, can yield a tight pitch or small pitch arrangement, as would be apparent to a skilled artisan upon reading this description. Nozzles 1002A, 1002B, and 1002C can be releasably coupled to between one and four, as appropriate, heater devices 1004.

Exemplary System with Multiple Heater Devices

Figure 11:
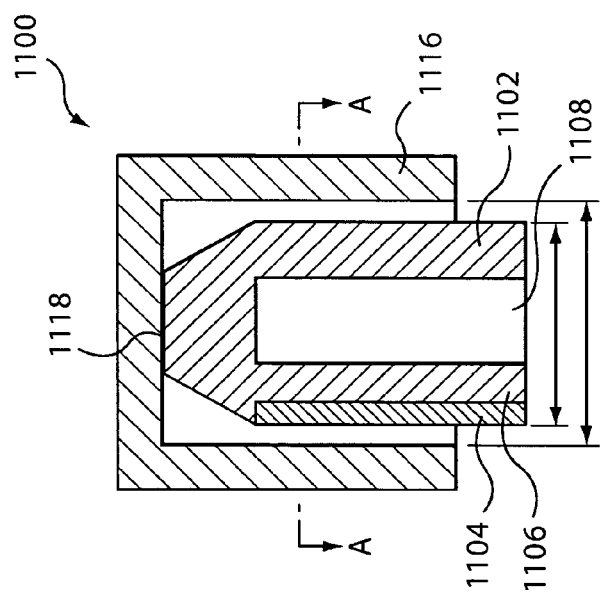
FIG. 11 shows a cross-sectional view of an exemplary nozzle according to an embodiment of the present invention.

FIG. 11 shows a cross-sectional view of a system 1100 according to an embodiment of the present invention. System 1100 includes a nozzle 1102 having up to four heater devices 1104 (see FIG. 12, heater devices 1104A-D) releaseably coupled to first through fourth sides or walls 1106 (see FIG. 12, sides or walls 1106A-D). A nozzle channel or melt channel 1108 runs longitudinally through nozzle 1102, such that a melt flow (not shown) is transmitted to mold cavity 1116 through tip 1118 of nozzle 1102.

Figure 12:
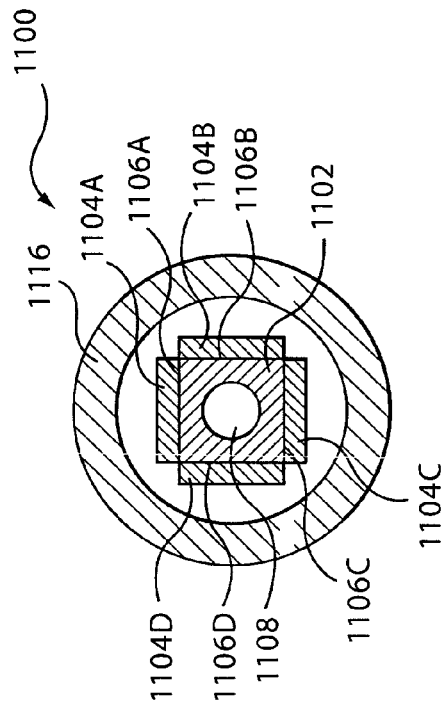
FIG. 12 shows a cross-sectional view of the nozzle in FIG. 11 looking into line A-A in FIG. 11.
Figure 13:
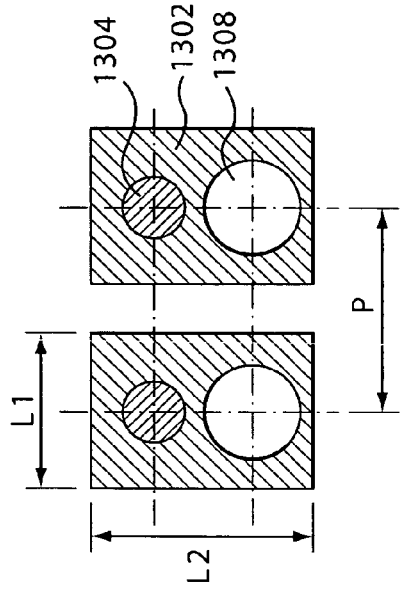
FIG. 13 shows a cross-sectional view of a conventional nozzle and heater arrangement.

FIG. 12 shows a cross-section of system 1100 looking into line A-A. As seen in this view, sides 1106A-D of nozzle 1102 have heater devices 1104A-D coupled thereto.

It is to be appreciated that other arrangements of a planar heater and nozzle are contemplated within the scope of the present invention. Also, the planer heater can be located on any face of the nozzle and if one face does not have a heater, it can have a layer of thermally insulated material such as ceramic. The film heater in some cases can be covered by a thermally insulated coating.

Film Heater Device

Figure 14:
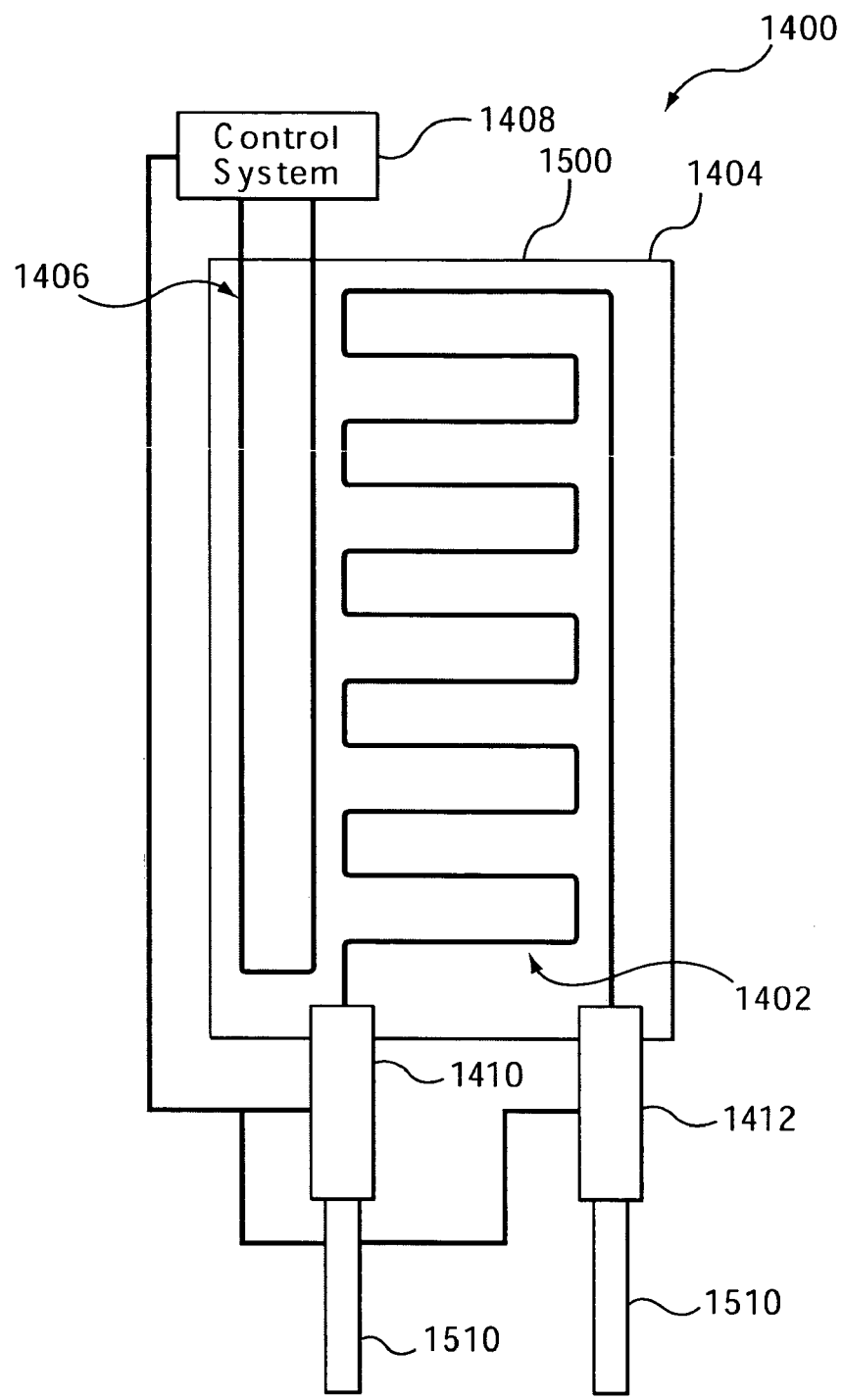
FIG. 14 shows a film heater device according to an embodiment of the present invention.

FIG. 14 shows a film heater device 1400 and FIG. 15 is a side view of film heater device 1400 of FIG. 14 according to an embodiment of the present invention.

As best seen in FIG. 15, film heater device 1400 includes first and second film heating elements 1500 and 1502 that are supported using a support 1504 (e.g., a heater support). Located between first and second film heating elements 1500 and 1502 and heater support 1504 are first and second dielectric layers 1506 and 1508, respectively. It is to be appreciated that film heater device 1400 can include more than two film heating elements 1500 and 1502. Also, although not shown, it is to be appreciated that film heating elements 1500 and 1502 can be located in a side-by-side relationship on the same surface of heater support 1504 or on a same side of heater support 1504 in a stacked configuration. If film heating elements 1500 and 1502 are configured in a stacked configuration, a dielectric layer (e.g., similar to element 1506 or 1508) can be formed between film heating elements 1500 and 1502. It is further to be appreciated that, in various combinations, the film heating elements 1500 and 1502 can be made from thin or thick film materials, can be rigid or flexible, and can be substantially planar, substantially curved, or partially planar and curved, as would be apparent to one of ordinary skill in the art upon reading this description.

Figure 18:
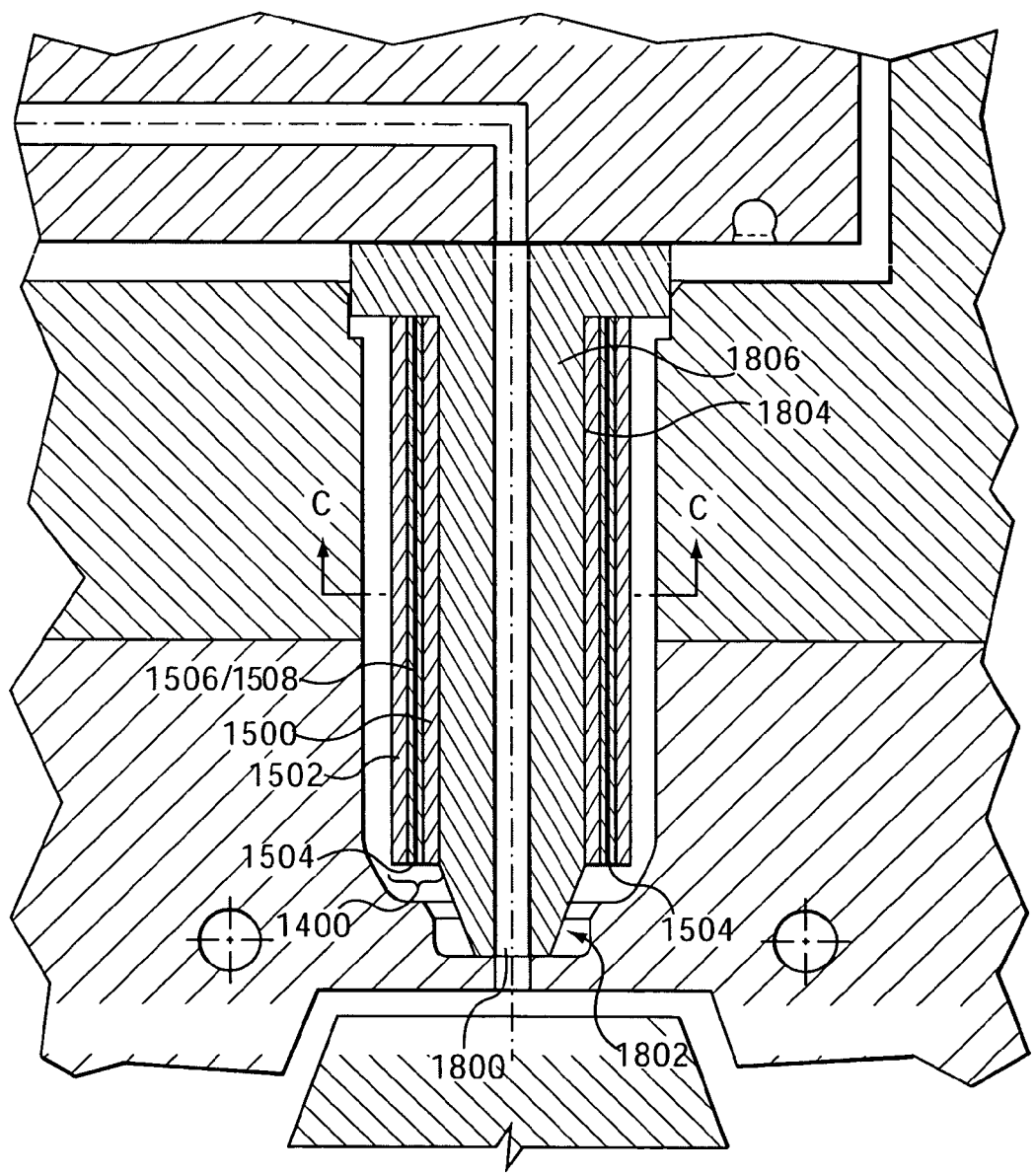
FIG. 18 shows a sectional view of a cylindrical nozzle according to an embodiment of the present invention.

Turning back to FIG. 14 each film heating element 1500 or 1502 has an electrical resistive layer 1402 (e.g., a patterned layer) on at least one surface 1404. A pattern formed using electrical resistive layer 1402 can be of any shape, and optimally is configured to produce a uniform heat profile along a longitudinal direction of a melt channel 1600 (FIG. 16) of a nozzle 1602 (FIG. 16) or a melt channel 1800 (FIG. 18) of nozzle 1802 (FIG. 18).

The film heating elements 1500 and 1502, also called solid state heating elements, are devices including a two-dimensional (2D) patterned electrically conductive layer or wire 1402 whose thickness is insignificant in comparison to the thickness of a nozzle body (not shown). As discussed above, film heating elements 1500 and 1502 can be either thin (e.g., a thickness of about a few microns to about a little under a millimeter) or thick (e.g., a thickness of about 1 millimeter to about several millimeters).

For example, film heating devices 1500 and 1502 can be formed through lithography techniques, integrated circuit fabrication techniques, or the like. This allows for easy duplication of consistently accurate patterned film heaters of any size required for a nozzle area receiving the film heating elements 1500 and 1502. In one lithography fabrication method, a conductive ink is used to form a heating pattern layer 1402 on film heating elements 1500 and 1502. Typical resistivities for carbon inks are 25 to 500 ohms per square inch at 15 microns DFT. More conductive inks can be made with a blend of carbon and silver inks ranging from 0.05 to 25 ohms per square inch.

Exemplary film heaters using conductive ink can be found in U.S. Pat. No. 6,043,467 to Little, U.S. Pat. No. 5,504,304 to Noguchi et al., U.S. Pat. No. 5,411,392 to Von Buren, U.S. Pat. No. 4,999,049 to Balderson et al., U.S. Pat. No. 4,859,835 to Balderson, U.S. Pat. No. 4,286,677 to Hurko et al., and U.S. Pat. No. 3,647,532 to Friedman et al., which are all incorporated by reference herein in their entireties.

Using film heating devices 1500 and 1502 allows for the relatively thin thicknesses discussed above, as compared to conventional heaters, and allows for the manufacture of batches of accurate heaters during one production cycle. Also, using film heating devices 1500 and 1502 in an embodiment in which they are releasable or not integral with a nozzle surface allows them to be less susceptible to possible damage that can be caused through thermal expansion of the nozzle.

This is in contrast to conventional heaters as shown in U.S. Pat. No. 3,812,323 to Pink and U.S. Pat. No. 5,411,392 to Von Buren, which both teach having a heater that is only a physical wire. Both of these documents are incorporated by reference herein in their entireties. The physical wire is not self supported and must be coupled to the nozzle itself. Also, the heaters in these documents cannot be easily duplicated, they must be individually manufactured. Further, because of the material used in the heater of these patents, the heaters must be of a certain size, which may be larger than is required by nozzles used in the present invention.

Optionally, surface 1404 of each film heating element 1500 or 1502 can include a temperature sensing device 1406, which may be coupled to a control system 1408. Control system 1408 can be coupled to terminals 1410 and 1412 of electrical resistive layer 1402. Terminals 1410 and 1412 receive electrical energy from an energy source (not shown) (e.g., a power supply) via conductors 1510 (FIG. 15).

In one embodiment, when first heating element 1500 and second heating element 1502 are operating during alternative operating times, control system 1408 turns heating elements 1500 and 1502 ON or OFF based on receiving a signal (and possibly based on a value of the signal) from temperature sensing device 1406. For example, in one application only one film heating element 1500 or 1502 may be needed to produce a desired amount of heat. Alternatively, during production of injection molded products, the operating film heating element 1500 or 1502 may stop or fail. If this occurs, temperature sensing device 1406 can detect the change (i.e., the reduction) in heat and send a signal to control system 1408 to turn the other one of the film heating elements 1500 or 1502 ON. It is to be appreciated other scenarios are also possible for an alternative operation scheme, as would be apparent to one of ordinary skill in the art upon reading this description. This can be used to reduce production downtime and maintain the integrity of the processing.

In other embodiments, first and second film heating elements 1500 and 1502 can operate at a same time to increase an amount of heat generated compared to operating only one at a time. This may be done because of space considerations (e.g., a surface area of outside surfaces 1604 (FIG. 16) or 1804 (FIG. 18)) requiring a certain sized film heater device 1400, wherein a thickness (e.g., a number of heating elements 1500, 1502, or the like) of film heater device 1400 is not a concern. In this respect, more than two heating elements (not shown) similar to heating elements 1500 and 1502 can be used. For example, pairs of heating elements can operate during alternative heating periods. Then, four, six, etc. heating elements can be used, where two or three heating elements are ON at a time, while two or three other heating elements are in reserve and only turn ON when needed.

It is to be appreciated that a coating (e.g., a diamond or diamond-like (e.g., ceramic coating) can be placed over an outside surface of film heating elements 1500 and 1502 or film heater device 1400, which may be used to protect film heating elements 1500 and 1502 and/or the film heater device from damage. This can be done through a processing method, such as: (1) forming a dielectric layer (e.g., ceramic, diamond, or diamond-like layer) on a film heater support; (2) pattern the support with an electrical resistive layer; and (3) forming another dielectric layer (e.g., ceramic, diamond, or diamond-like layer).

Diamond is not only the hardest material known to man it also has a number of other remarkable properties including: a very high thermal conductivity (approximately four times that of copper), high chemical innertness, very low electrical conductivity, and, when properly prepared, very low surface friction comparable to TEFLON. Diamond can be created as a thin or thick coating at low pressure and high temperature using plasma enhanced chemical vapor deposition (PECVD) methods. With these properties diamond coatings can achieve exceptional levels of performance in a wide variety of applications.

Several methods have been developed for producing diamond-like carbon (DLC) films: primary ion beam deposition of carbon ions (IBD), sputter deposition of carbon with or without bombardment by an intense flux of ions (physical vapor deposition or PVD), and deposition from an RF plasma, sustained in hydrocarbon gases, onto substrates negatively biased (plasma assisted chemical vapor deposition or PACVD).

Plasma assisted CVD techniques employing RF and DC glow discharges in hydrocarbon gas mixtures produce smooth amorphous carbon and hydrocarbon films, which have mixed $sp^2$ and $sp^3$ bonds. These exhibit hardness values of 900-3000 Hv. The CVD processes will generally require deposition temperatures of at least 600° C. to give the required combination of properties, however, low temperature deposition is possible. The CVD technique gives good deposition rates and very uniform coatings, and is suited to very large-scale production.

Ion Beam Deposition, another technique for DLC deposition, is based on ion beam deposition. This has the advantage of being able to deposit high quality coatings at very low temperatures (near room temperature). The disadvantages are that the deposition rate is very low (1 µm/hr maximum) and that even substrates of simple geometry need complex manipulation to ensure uniform deposition.

A further technique has now been developed that can readily apply a-C:H films (>4 µm) to substrates of any shape. The process is based on closed field unbalanced magnetron sputter ion plating (CFUBMS) combined with plasma assisted chemical vapor deposition. The commercial importance of such a development is already being seen and the potential range of applications and possibilities are enormous. The technique is highly innovative and it provides the flexibility required to ensure excellent adhesion to any substrate, and the coating of any component shape or material, in a high productivity industrial process.

Flat Nozzles Using Film Heater Devices

Figure 16:
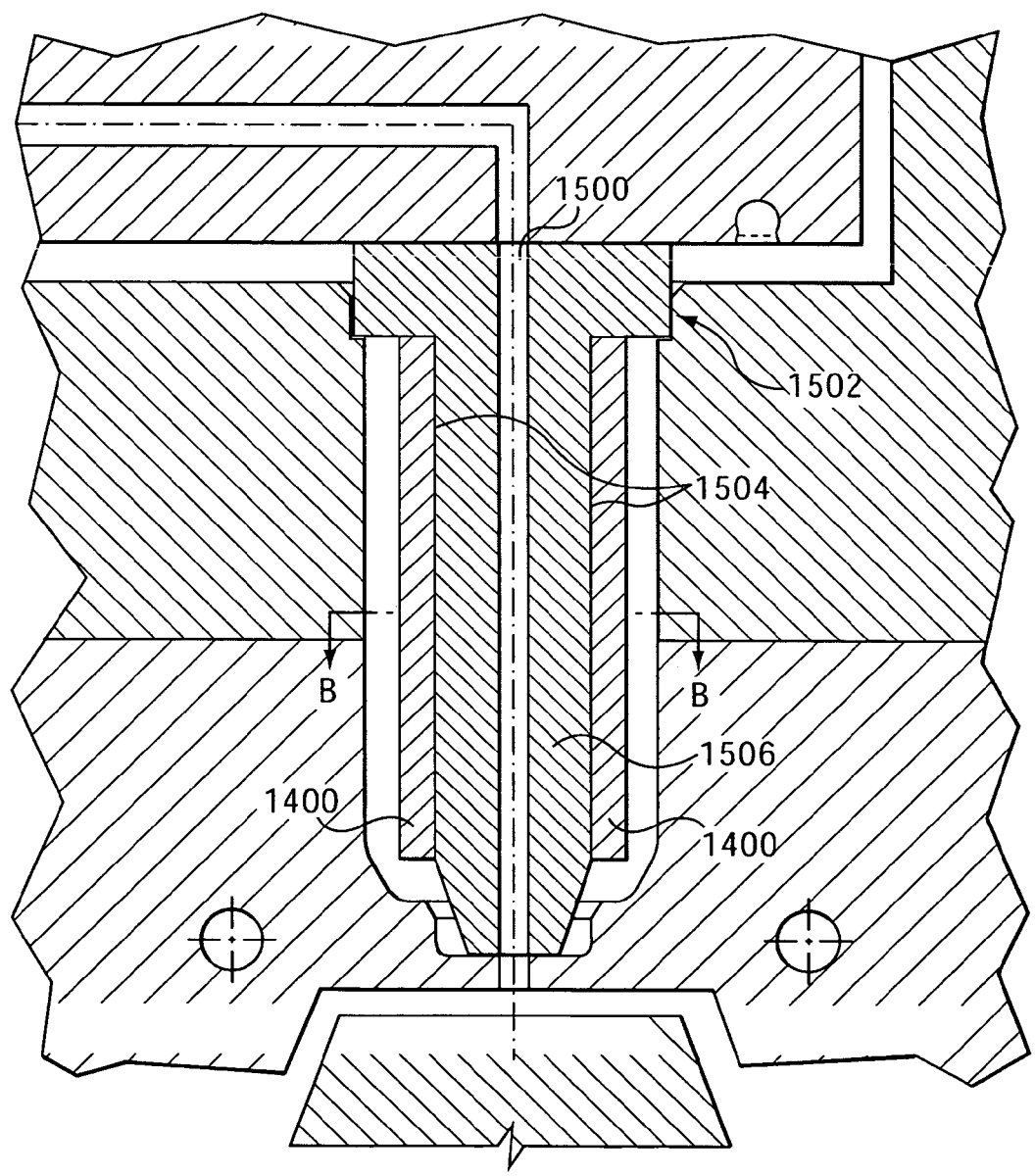
FIG. 16 is a partial sectional view of a flat nozzle according to an embodiment of the present invention.

FIG. 16 shows a partial sectional view of flat nozzle 1602 and FIG. 17 shows a cross-sectional view of flat nozzle 1602 along line B-B in FIG. 16, according to embodiments of the present invention. A nozzle is considered flat, as is known in the relevant arts, and as best seen in FIG. 17, when one or more outside surfaces 1604 are substantially flat and a general cross-sectional shape of a nozzle body 1606 is square, rectangular, or the like. Flat nozzles are generally used to decrease a pitch between nozzle tips and/or spacing between nozzles in a nozzle array. Sometimes, when a pitch needs to be relatively small (or thin) an array of flat micro nozzles can be used.

One or more outside surfaces 1604 can receive respective ones of film heater device 1400 (shown with less detail in FIGS. 16-17 than previously described for brevity). Each film heater device 1400 can be permanently coupled, made integral, or releasably coupled to each surface 1604, as would be appropriate for various embodiments. When film heater device 1400 is releasably coupled, a releasable coupling device (not shown) can be used, such as a screw, a bolt, a clamp, an easily removable or dissolvable adhesive, a magnet, or the like. This allows for easy removal of the film heater device for subsequent repair or replacement of the first and second heating elements 1500 and 1502, which can reduce production downtime. Although two sides 1604 are shown to be receiving respective film heater devices 1400, it is to be appreciated that one, two, three, or four sides 1604 can each receive respective film heater devices 1400.

In the embodiments related to FIGS. 16-17, film heater device 1400 is shown as being substantially planar. However, film heater device 1400 can be shaped such that it is complementary to a shape of surface 1604. For example, if surface 1604 has a curved section or portion, film heater device 1400 can also have a complementary curved section or portion.

The film heater device 1400 imparts radiant heat to nozzle 1602 and to viscous material that can flow there through to maintain a selected temperature in the material.

Cylindrical Nozzles Having Film Heater Devices

FIG. 18 shows a sectional view of cylindrical nozzle 1802 and FIG. 19 shows a cross-sectional view of cylindrical nozzle 1802 along line C-C of FIG. 18, according to an embodiment of the present invention. Cylindrical nozzle 1802 includes a nozzle body 1806 having a cylindrical outside surface 1804 and a melt channel 1800. Film heater device 1400 is coupled to outside surface 1804. In this configuration, film heater device 1400 is curved to conform to a shape of outside surface 1804. Nozzle 1802 is configured to function similarly to nozzle 1502.

It is to be appreciated that other nozzle shapes now known in the art or developed in the future can be coupled to film heater device 1400, and are all contemplated within the scope of the present invention.

Exemplary Environment

Figure 20:
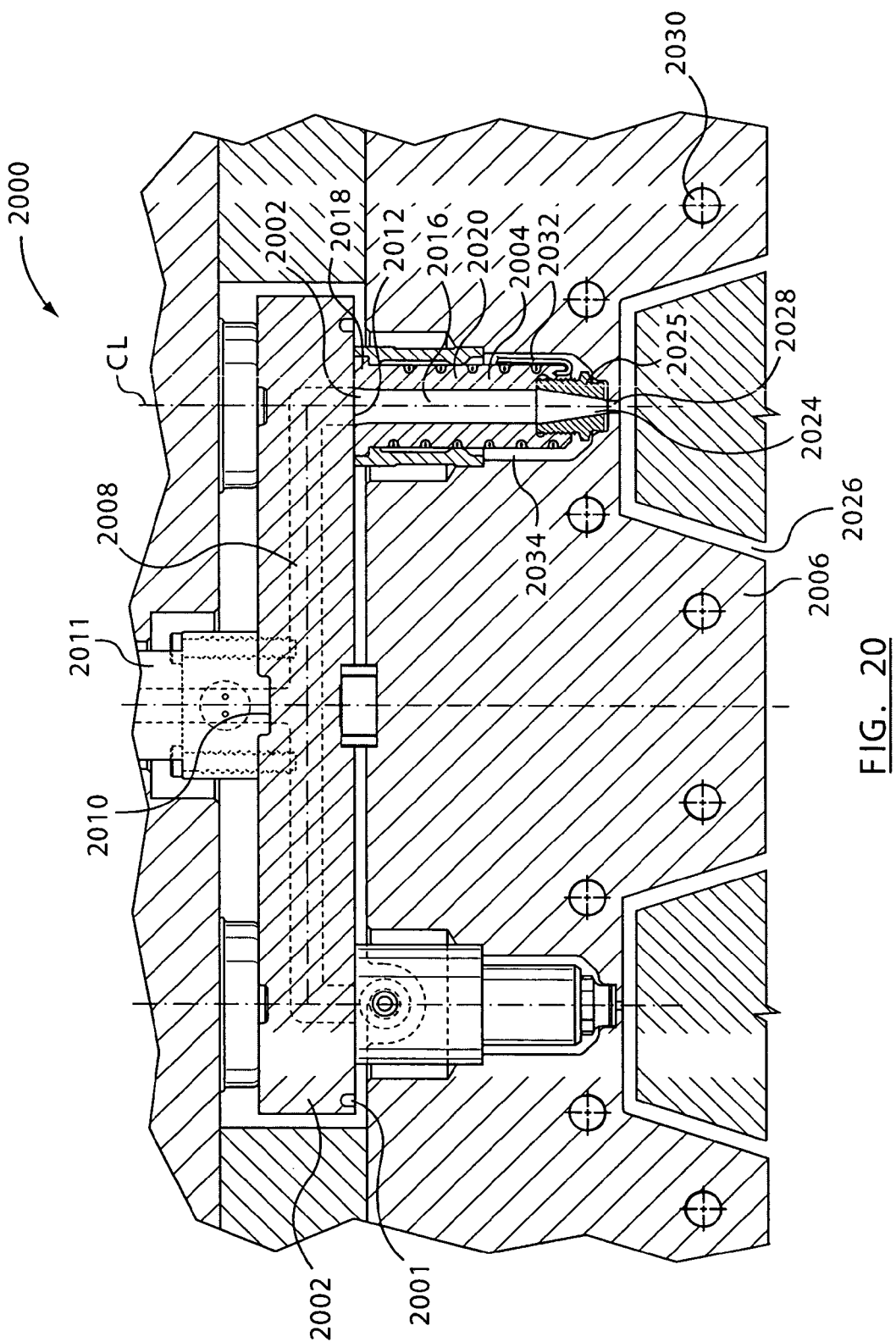
FIG. 20 illustrates a partial sectional view of an injection molding machine in which the present invention may be utilized.

FIG. 20 illustrates a partial sectional view of an injection molding apparatus 2000 in which the present invention may be utilized. Apparatus 2000 includes a manifold 2002 (e.g., a hot runner manifold), a plurality of nozzles 2004, and a mold plate 2006. Manifold 2002 has a plurality of manifold melt channels 2008 extending therethrough from an inlet 2010, which is proximate a sprue bushing 2011, to a plurality of outlets 2012. Manifold 2002 includes a heater 2001 for heating melt in the manifold melt channels 2008.

A nozzle melt channel 2016 extends through nozzle 2004. A tip 2025 is coupled to a body portion 2020 and includes an outlet 2024. A head portion 2018 of nozzle 2004 abuts against a downstream surface of manifold 2002 so that one of manifold melt channel outlets 2012 communicates with an inlet 2022 of nozzle melt channel 2016. Nozzle melt channel 2016 may be generally longitudinally centered in head and body portions 2018 and 2020, i.e., melt channel 2016 may extend generally along axis CL.

Mold plate 2006 includes a plurality of mold cavities 2026 in which injection molded articles are formed. Each mold cavity 2026 receives melt through a gate 2028, which is in communication with outlet 2024 from one of nozzles 2004 and it proximate tip 2025 of one of nozzles 2004. Mold plate 2006 may be cooled by means of a fluid flowing through a plurality of cooling channels 2030, to solidify melt in mold cavities 2026, thereby forming molded articles (not shown).

Mold plate 2006 also includes a plurality of nozzle cutouts 2034, into which nozzle 1404 is inserted.

Each nozzle 1404 includes a heater 2032 that is wrapped around body portion 2020. For example, a film heater, as discussed above, can be used, or a coil heater as shown.

In use, melt passes from a melt source (not shown), through manifold inlet 2010, through manifold melt channels 2008, through nozzle melt channels 2016, through gate 2028 and into melt cavities 2026.

It will be appreciated that nozzles 2004 may be used with configurations of injection molding apparatus, other than that shown in FIG. 20. For example, nozzles 2004 may be used with injection molding apparatuses having a single mold cavity. Nozzles 2004 may also be used with co-injection molding apparatuses that have a plurality of manifolds 2002. Nozzles 2004 may also be used with stack-mold machines.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An injection molding system comprising:
    an injection nozzle having a nozzle body with a substantially flat outer surface and a melt channel; and
    a substantially planar film heater device releaseably coupled to the substantially flat outer surface of the nozzle body, the film heater device including a support device and first and second film heating elements coupled to the support device, wherein the first and second thin film heating elements are positioned about the nozzle body to cover substantially the same area of the melt channel, whereby the film heater device is configured to provide a desired amount of heat from one or both of the first and second film heating elements.

2. The system of claim 1, wherein the first and second film heating elements comprise a patterned heating layer patterned on the support device.

3. The system of claim 2, wherein the patterned heating layer comprises resistive heat paths.

4. The system of claim 1, wherein the first and second film heating elements are positioned on a same surface of the support.

5. The system of claim 1, wherein the first and second film heating elements are stacked on a same side of the support.

6. The system of claim 1, wherein the first and second film heating elements are coupled to opposite sides of the support.

7. The system of claim 1, further comprising a temperature sensing device.

8. The system of claim 7, further comprising:
    a control system, wherein the temperature sensing device outputs a signal to the control system, and wherein the control system controls the film heater device to provide redundant or concurrent operation of the first and second film heater elements.

9. The system of claim 1, wherein the first and second film heating elements comprise thin film heating elements.

10. The system of claim 1, wherein the first and second film heating elements comprise thick film heating elements.

11. The system of claim 1, wherein one of the first and second film heating elements comprises a thin film heating element and another one of the first and second film heating elements comprises a thick film heating element.

12. The system of claim 1, wherein the first and second film heating elements are configured to operate concurrently.

13. The system of claim 1, wherein the first and second film heating elements are configured to operate alternatively.

14. The system of claim 1, wherein the film heater device further comprises more than the first and second film heating elements.

15. The system of claim 2, wherein the patterned heating layer comprises one of a conductive ink and a conductive paste.

16. The system of claim 1, wherein the heater device is at least partially coated with one of a diamond or ceramic coating.

17. The system of claim 1, wherein the film heater device provides for one of the first and second heating elements ceasing to operate.

18. The system of claim 1, wherein the first and second film heating elements are of substantially the same size.

19. The system of claim 1, wherein the first and second film heating elements are configured to be visually inspected for defects.

20. The system of claim 1, wherein the nozzle is a flat micro nozzle.

21. The system of claim 1, wherein the first and second film heating elements comprises at least one of thick film heaters and thin film heaters.

22. An injection molding apparatus, comprising:
a manifold having a melt channel;
a mold cavity plate having a mold gate and a nozzle bore therein;
at least one nozzle including a nozzle body positioned in the nozzle bore, the nozzle body having a substantially flat outer surface and a nozzle melt channel in fluid communication with a melt channel in a manifold; and
a releasably securable substantially planar film heater device releasably secured to the substantially flat outer surface of the nozzle body, the film heater device including a support device and first and second film heating elements coupled to the support device, wherein the first and second film heating elements are positioned about the nozzle body to cover substantially the same area of the melt channel;
wherein the film heater device provides a desired amount of heat from one or both of the first and second film heating elements.

23. The injection molding apparatus of claim 22, wherein the first and second film heating elements are of substantially the same size.

24. An injection molding apparatus, comprising:
an injection molding manifold having a manifold melt channel;
an injection molding nozzle adjacent said manifold, said nozzle having a nozzle head portion and a nozzle body portion and including a nozzle melt channel, wherein said nozzle body has a substantially flat nozzle body surface; and
a nozzle heater having a substantially flat heater substrate, a first film heater element patterned on said heater substrate along a portion of said nozzle melt channel and a second film heater independent from the first film heater, wherein said second film heater is patterned on said heater substrate at least partially along the same portion of said nozzle melt channel, wherein the nozzle heater is removably attached to said substantially flat nozzle body surface such that said heater is removable without distancing the nozzle from the manifold.

25. The injection molding apparatus of claim 24, wherein said first and second film heaters are connected to separate electrical power sources.

* * * * *